United States Patent [19]

Barton

[11] Patent Number: 5,609,114
[45] Date of Patent: Mar. 11, 1997

[54] NO-TILL DISK OPENING SYSTEM AND METHOD

[76] Inventor: Hugh Barton, Box 123 Conquest, Saskatchewan, Canada, S0L 0L0

[21] Appl. No.: 421,326

[22] Filed: Apr. 13, 1995

[30] Foreign Application Priority Data

Apr. 15, 1994 [CA] Canada .................................. 2121388
Apr. 12, 1995 [CA] Canada .................................. 2146904

[51] Int. Cl.$^6$ ........................................................ A01C 5/00
[52] U.S. Cl. .......................... 111/167; 111/924; 111/192; 111/194; 172/574; 172/558; 172/603; 172/604; 172/617; 172/636
[58] Field of Search ........................... 111/200, 190, 111/191, 182, 193, 194, 195, 196, 163, 139, 900, 166, 167, 168, 157, 121, 924; 172/538, 701, 574, 575, 394, 546, 556, 558, 559, 602, 603, 600, 604, 617, 636

[56] References Cited

U.S. PATENT DOCUMENTS

| | | | |
|---|---|---|---|
| 191,054 | 5/1877 | Hill . | |
| 1,058,657 | 4/1913 | Broman et al. . | |
| 1,168,594 | 1/1916 | Berendes | 172/603 |
| 1,229,194 | 6/1917 | Patric . | |
| 1,234,372 | 7/1917 | Miller . | |
| 1,317,402 | 9/1919 | Taylor | 111/193 |
| 1,901,299 | 3/1933 | Johnson | 111/196 X |
| 2,577,775 | 12/1951 | Lemmon et al. | 111/195 |
| 2,771,044 | 11/1956 | Putifer | 172/394 |
| 2,829,577 | 4/1958 | Williams | 172/574 |
| 3,118,506 | 1/1964 | Morris | 111/194 X |
| 3,244,237 | 4/1966 | Keplinger et al. | 172/603 |
| 3,362,361 | 1/1968 | Morrison, Jr. | 111/193 |
| 3,507,233 | 4/1970 | Greig et al. | 111/85 |
| 3,718,191 | 2/1973 | Williams | 172/603 X |
| 4,031,834 | 6/1977 | Klenke . | |
| 4,275,670 | 6/1981 | Dreyer . | |
| 4,331,205 | 5/1982 | Sorenson et al. | 172/538 |
| 4,366,760 | 1/1983 | Dreyer . | |
| 4,407,207 | 10/1983 | Dreyer . | |
| 4,422,392 | 12/1983 | Dreyer et al. | 172/394 X |
| 4,493,274 | 1/1985 | Robinson, Jr. et al. | 172/538 X |
| 4,570,554 | 2/1986 | Clark | 111/196 |
| 4,596,199 | 6/1986 | Dietrich, Sr. et al. | 111/192 X |
| 4,760,806 | 8/1988 | Bigbee . | |
| 4,781,129 | 11/1988 | Swanson . | |
| 4,932,340 | 6/1990 | Benzel . | |
| 5,060,585 | 10/1991 | Alexander | 111/194 X |
| 5,235,922 | 8/1993 | Deckler | 172/239 X |
| 5,481,990 | 1/1996 | Zacharias . | |

FOREIGN PATENT DOCUMENTS

| | | |
|---|---|---|
| 1294177 | 1/1992 | Canada . |
| 540995 | 5/1993 | European Pat. Off. . |
| 391347 | 10/1908 | France . |
| 1576504 | 8/1969 | France . |
| 207509 | 11/1968 | U.S.S.R. . |
| 132325 | 9/1919 | United Kingdom . |
| 1262903 | 2/1972 | United Kingdom . |

OTHER PUBLICATIONS

European Search Report EP95 302496, 11 Aug. 95.
Fink, Jerome T. et al, "No-Till Drill Utilizing Adjustable Seed Furrow Openers", Dec., 1992.
Terratend Pty. Ltd. Catalogue (Australia) (Jul. 15, 1994).
Nabatyan, M. P. "Coulters for High Speed Drills", 1969 (Translation).

*Primary Examiner*—Terry Lee Melius
*Assistant Examiner*—Victor Batson
*Attorney, Agent, or Firm*—Howrey & Simon; Richard S. Meyer

[57] ABSTRACT

A method and apparatus for improved agricultural seeding; especially useful in no-till direct seeding. In the illustrated embodiment an inclined furrow is cut with a rotating disk that is inclined with respect to the vertical and the horizontal; the furrow has a raised lip, and straw and the like stalks are cleaved during the cutting. Seed is inserted by known means, and then a packer wheel, preferentially inclined in vertical and horizontal directions opposite to those the disk is inclined, runs across the lip and closes the furrow. Advantages include substantially reduced energy required for the furrow cutting, less weight required on the furrowing disk, more even seeding depth, less hairpinning, less soil disturbance, and less weed seed burial.

40 Claims, 7 Drawing Sheets

NO-TILL DISK OPENING SYSTEM AND METHOD

INTRODUCTION AND DESCRIPTION OF THE PRIOR ART

Planting methods are of worldwide interest, and especially in North America, where vast acreages are tilled by machinery, the evolution of the automatic furrow opening and packing mechanism is important. This invention relates to methods of furrow opening and closing, and to the apparatus used. It is especially relevant to the case of no-till direct seeding.

Tilling a large area effectively must take into account the fact that the soil is not always level, not always of an even hardness, not always clear of rooted hay stubble, and not always clear of weed seeds. A naive device pulled behind a tractor to open a furrow, for instance a simple disk oriented vertically, will periodically rise out of the soil due to dry, uneven, or heavily packed earth; will sink too deeply when the earth is loose or uneven in the other direction; will press rooted hay stalks down into the furrow (a hazard known as hairpinning); and will incorporate surface weed seeds into the furrow. Each of these can be disastrous to a large scale crop, which depends on even rates of germination and growth in order to mature at a given time for automatic harvest. For instance, it has been noted that as much as 1 inch difference in depth of seed planting can produce enough variation in germination and growth to significantly reduce a harvest (U.S. Pat. No. 4,781,129, Swanson et al, 1988, col. 1, lines 56-8). Hairpinning allows the aging hay stalks to act as breather tubes to dry out the soil and lessen germination; and weed seed incorporation has obvious detrimental results, and these can be disastrous when combined with fertilizer applied directly to them in the furrow.

Various methods have been developed to try to deal with some of these problems, but with only partial success. For instance, U.S. Pat. No. 1,234,372, Miller, 1917, incorporated a heavy flange concentric with the furrow-opening disk, intended to limit depth in loose soil and weigh the disk down in dense soil. In another more recent system, a spring mechanism is used to force the disk down (U.S. Pat. No. 4,031,834, Klenke, 1977), which has the advantage of proportional reaction: as the soil gets harder or denser, the disk is forced up, and the torsion in the spring increases proportionally and continues to hold it down, thereby producing a more even depth. However this has not been fully satisfactory, and systems using a spring and hydraulic-regulated packer wheel as depth control (U.S. Pat. No. 4,275,670, Dreyer, 1981), have been attempted; and others are known with both spring-disk and adjustable packer-wheel control combined. U.S. Pat. No. 4,760,806 (Bigbee et al, 1988), in a very elaborate system, employs two packer wheels as well as spring pressure.

None of the above, however, have been completely satisfactory: all take a great deal of pressure to maintain the disk in the soil, and great care and complexity to deal with variations in soil condition. Plus, none have improved at all on the earliest art (see U.S. Pat. No. 1,058,657, Broman & Offermann, 1913; and U.S. Pat. No. 1,229,194, Patric, 1917) with respect to hairpinning and incorporation of surface seeds: a large furrow is cut open by one or two vertically-oriented disks, or disks angled with respect to the line of travel; then seeded and packed with a wide wheel. They all disturb the soil to a great degree during the furrowing, seeding, and packing operation.

Of some interest is Russian patent 207,509, (1968; "Single Disc Coulter,") which claims and diagrams tilting a disk at unspecified angles, both horizontally and vertically. While tilting horizontally as well as vertically can be useful if certain parameters are met (as will be made clear below,) these are not included in the Russian patent; for instance, no provision is made for packing wheel or other furrow-closing. This omission is understandable, since the most efficient set-up of packing varies with disk angles, and that document claims no specific angled disking, nor any functional explanation of an integrated apparatus that would seed, fertilize, and furrow-close effectively.

SUMMARY OF THE INVENTION

The present invention, which has been constructed and field-tested, provides a solution as follows: if the disk is held at a constant angle to the vertical, as well as at a small angle toed in to the line of travel, so that it cuts the furrow on a slant and undercuts and raises the soil an inch or so over the new furrow, seeds and/or fertilizers and then closes and packs the furrow with a packer oriented at an opposite angle, a substantial reduction in force is necessary to make the cut, hairpinning is reduced, and the soil is significantly less disturbed and less surface seeds are incorporated.

With the addition of other elements already known in the art, such as adjustable spring-loaded packer wheel providing partial disk depth control, and cleaner wheel beside the disk, a more energy-efficient, more precise, cleaner, and, at a word, superior, furrow-opening and planting system is disclosed.

An object of the present invention is to provide for an improved method of seeding and/or fertilizing comprising the steps of cleaving soil along a line of travel by means of an agricultural machine so that an inclined furrow with a raised lip is created; inserting seed and/or fertilizer into the furrow; and closing the furrow by known means, so that less pressure is required and less soil is disturbed than by current practice that creates substantially vertical furrows. This cleaving may be performed by means of a tool that is a substantially flat disk, with the flat surface of the tool oriented to be substantially vertical and substantially parallel to the line of travel, except that said disk is angled horizontally from the line of travel to form a leading and trailing surface and is angled vertically toward said trailing surface.

It is a further object to provide for an apparatus for improved seeding comprising a first generally upright rotating disk extending from said connecting means, said disk set at a first horizontal angle to the line of travel to provide a leading surface and a trailing surface relative to the direction of travel, and set at a first angle to the vertical whereby a top of said disk is inclined generally toward said trailing surface; seed or fertilizer delivery means behind said trailing surface of said disk; and a packer wheel substantially in line of travel behind said disk.

Thus, when the machine moves in the line of travel, the disk cleaves soil and root stalks and creates an angled furrow with a raised lip; seed is inserted into the furrow by the seeding means; and the lip is pressed down by the packer wheel to close the furrow with less pressure required and with less soil disturbance and weed seed burial than by conventional furrowing and seeding means that creates a substantially vertical furrow.

In a preferred embodiment the disk has a cleaning and soil throw control means associated with it to minimize soil disturbance in cutting said furrow.

Such an apparatus may preferably have the packer wheel inclined at from 4° to 10° to the line of travel to provide a leading surface and a trailing surface; and at an angle of 5° to 15° to the vertical whereby a top of said disk is inclined toward said trailing surface. The packer wheel may in addition have a generally convex "V" shaped running surface; the point of the "V" being rounded.

Such an apparatus may preferably have the disk inclined at 10° to 35° with respect to the vertical and 4° to 12° with respect to the line of travel.

In a further preferred embodiment a second disk is provided to cut a second furrow in a lower surface of said first furrow, whereby seed and fertilizer may be placed in a spaced relationship to each other.

BRIEF DESCRIPTION OF THE DRAWINGS

For this description, refer to the following diagrams, wherein like numerals refer to like parts.

DETAILED DESCRIPTION OF THE INVENTION

Figure 1A:
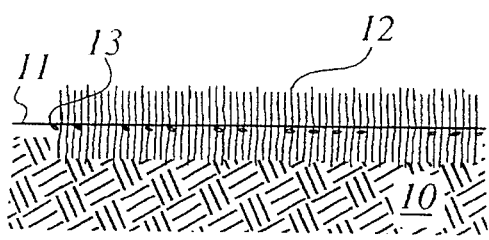
FIG. 1A, soil before invented disking; section view across line of travel.
Figure 1B:
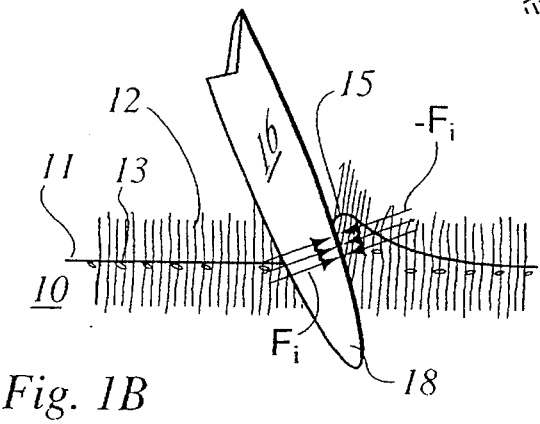
FIG. 1B, invented inclined disk; front view with soil section.

The basic sequence of the invented method will be explained with reference to partially schematic FIGS. 1A through 1E which are front section views across the line-of-travel of the cutting of soil indicated generally as 10 in FIG. 1A; the disk generally indicated as 16 in FIG. 1B is moving towards the viewer, that is, out of the page. (Problems with the prior art method are discussed below with reference to a parallel series of FIGS. 2A through 2E.)

In FIG. 1A, before tilling, surface 11 of soil 10 is undisturbed; it bears rooted stubble 12 and surface weed seeds 13.

When the invented inclined disk indicated generally as 16 is pulled through soil 10 into the position of FIG. 1B, several things occur simultaneously. As the disk 16 is pulled along, the outside surface 18 of disk 16 is pushing against soil 10 with force represented by arrows Fi; the soil 10 resists with a force $-F_i$ while being moved horizontally and vertically to form lip 15 of soil 10 at one of the opposed, inclined sides of furrow 19 (as shown in FIG. 1C.).

Figure 1C:
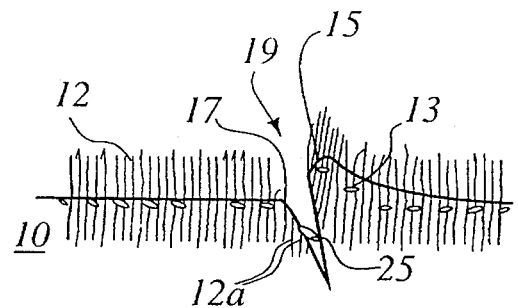
FIG. 1C, invented inclined furrow; section view across line of travel.
Figure 2A:
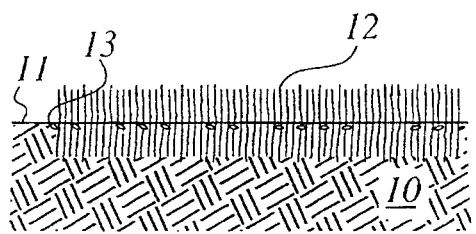
FIG. 2A, soil before prior art vertical disking; section view across line of travel.
Figure 2B:
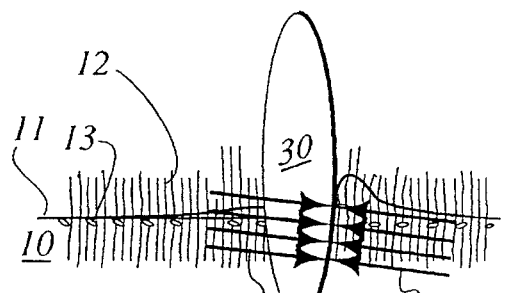
FIG. 2B, prior art vertical disk; front view with soil section.

With reference to the corresponding prior art in FIGS. 2A and 2B, it can be seen in 2B that vertical disk generally indicated as 30, here shown inclined with respect to the line of travel as is a common situation, must push against soil 10 horizontally, parallel to soil surface 11 with force indicated as $F_p$, opposed by $-F_p$. Since prior art disk 30 must compact the soil 10, rather than raise it, in order to cut, this force $F_p$ is substantially larger than force $F_i$ from FIG. 1B, as represented by the difference in arrow sizes, $F_p$ being larger than $F_i$. Thus more pressure is required to create the prior art furrow indicated generally as 20 in FIG. 2C than the inclined furrow indicated generally as 19 in FIG. 1C.

And for further advantages, to return to the invented inclined method, note in FIG. 1C, after inclined disk 16 has passed, that stubble stalks such as 12a have been cut instead of hairpinned (as is described below with reference to the prior art FIGS. 2A through 2E) and seeds 13 are still on the surface. Now packer wheel 34 seen in FIG. 1D, inclined in opposite directions from the incline of disk 16 in FIG. 1B, has closed the furrow 19, resulting in FIG. 1E, the finished planting, with relatively undisturbed soil surface, generally indicated at 22, over seed 25.

Figure 1E:
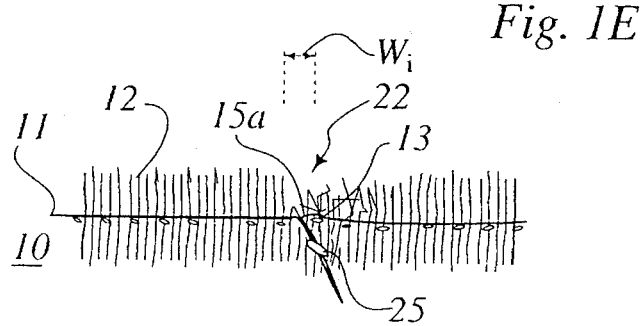
FIG. 1E, soil after invented inclined disking and packing; section view across line of travel.
Figure 2C:
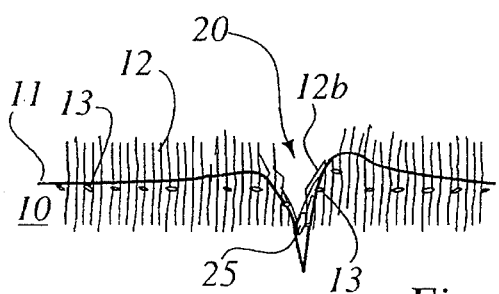
FIG. 2C, prior art vertical furrow; section view across line of travel.
Figure 2D:
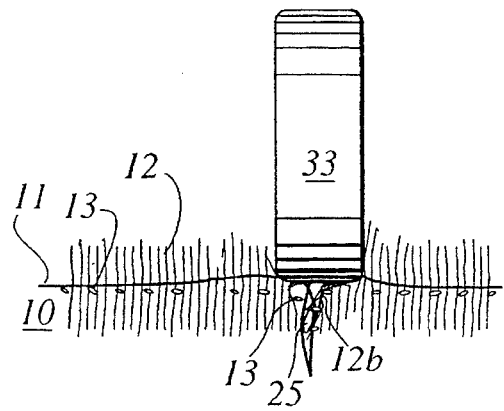
FIG. 2D, prior art vertical packer wheel; front view with soil section.
Figure 2E:
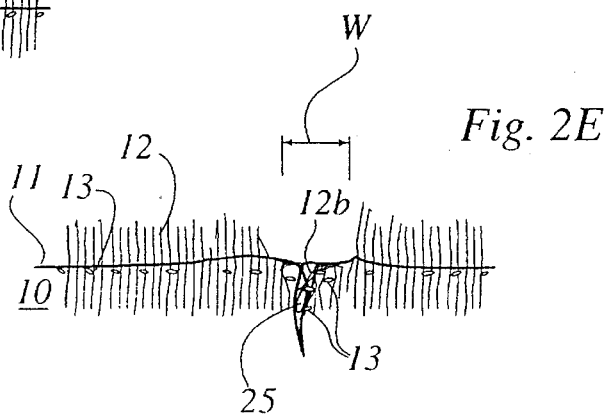
FIG. 2E, soil after prior art vertical disking and packing; section view across line of travel.

In contrast, FIGS. 2A through 2E show how in the conventional system (prior art) much more compaction, hairpinning, and weed seed incorporation occurs, as well as much more pressure being required on vertical disk 30 to form vertical furrow 20. Note hairpinning of stalks 12b in FIGS. 2C through 2E, and mixing of weed seeds 13 into soil 10 after vertical packer wheel 33 has passed, as shown in FIGS. 2D and 2E. Soil 10 is disturbed in vertical tilling, with reference to FIG. 2E, over a much wider area indicated as $W_v$, than it is with inclined tilling, area indicated as $W_i$ in FIG. 1E.

Since less energy is required to make the cut of inclined furrow 19 of FIG. 1C than the vertical furrow 20 of FIG. 2C, extra hard soil (not shown) will less frequently force the disk out, in the invented method. And in practice, the inventors have found that a rig with 200 lbs. of spring-loaded pressure on a double vertical disk (not shown) was not sufficient to prevent the disks bouncing completely clear of hard soil, whereas a single inclined disk cut in similar soil at only 100 to 150 pounds pressure. Although bouncing clear is an extreme case, this difference will also be reflected in less variation in minor deviations; so that the depth of a furrow such as 19 in FIG. 1C will be more even in depth than that of 20 in FIG. 2C. This translates into more regular germination and easier harvesting. It also means that it is not necessary to add extra weight to the disk, which is a common practice and increases the load that needs to be pulled.

The essential components of the embodiment of the invented method discussed above are further illustrated in FIGS. 3A through 3C. Before this is described, it might be mentioned that much of the adjustment linkage in this embodiment is of types well known in the art and will not be illustrated in complete detail; other types of linkages could equally-well be used.

Figure 3B:
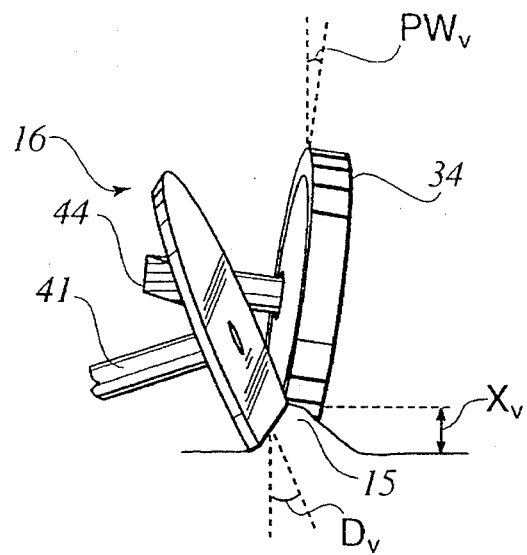
FIG. 3B, the embodiment of FIG. 3A, front view.
Figure 3A:
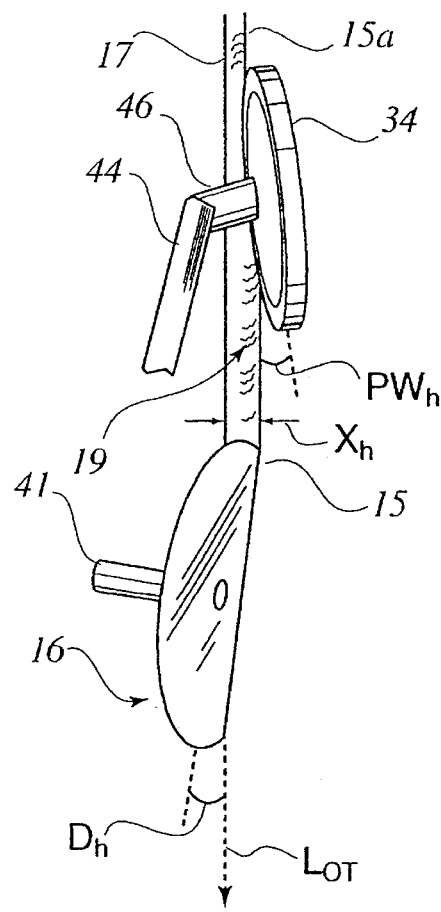
FIG. 3A, an embodiment of the invented inclined disking and packing apparatus; top view.

An invented inclined disk generally indicated as 16 in top view FIG. 3A is trailed by packer wheel 34. Packer wheel 34 is connected to agricultural apparatus (not shown in FIG. 3A) by packer beam 44 and packer wheel axle rod 46. Inclined disk 16 connects to the agricultural apparatus by disk axle 41. In this embodiment disk 16 is toed in 8° horizontally, indicated as $D_h$ on FIGS. 3A and 3C, from the line of travel indicated as $L_{OT}$.

Figure 3C:
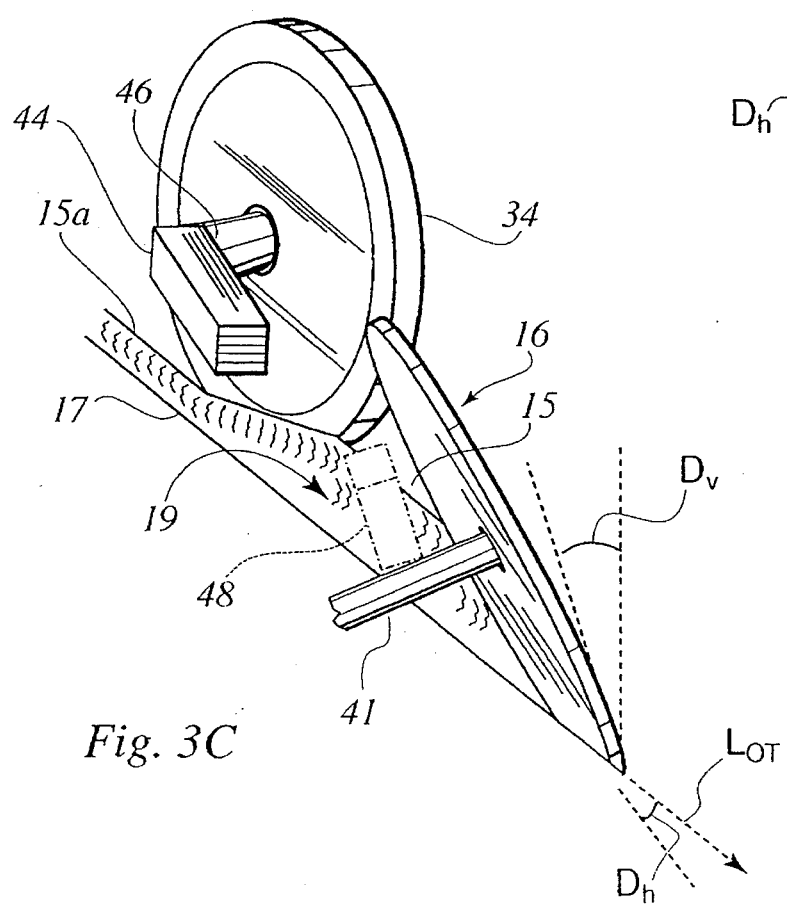
FIG. 3C, the embodiment of FIG. 3A, front perspective view.

As well, disk 16 is leaning inwards 23° from the vertical, indicated both on front view FIG. 3B and front perspective view FIG. 3C, as angle $D_v$. The combined effect of these two angles is that the soil 10 is undercut, lifted and moved by a small amount horizontally, creating angled furrow indicated as 19 on views 3A and 3C. (FIG. 1C shows a section view of such a furrow 19). Note on FIG. 3B how soil 10 is shunted upwards distance $X_v$, while at the same time shunted sideways outwards distance $X_h$ (FIG. 3A).

Figure 1D:
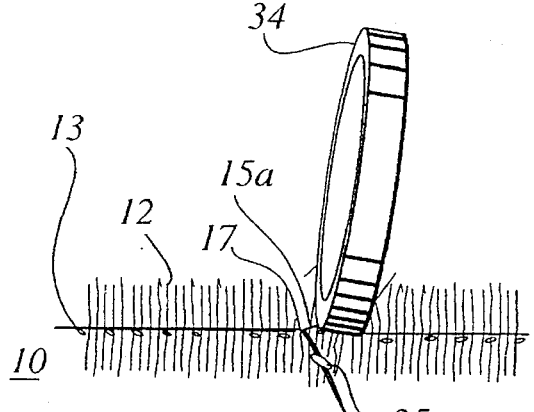
FIG. 1D, invented packer wheel; front view with soil section.

As the apparatus proceeds, seed and/or fertilizer is dispensed into furrow 19 by one or more chutes 48 (shown only on FIG. 3C; in broken lines), and then packer wheel 34 runs across top lip 15 of furrow 19. Since packer wheel 34 is angled in opposite directions to disk 16, the top lip 15 is pushed down and across towards cut line 17; lip 15 now has position of lip 15a, after packer wheel 34 passes. This position is best seen in FIGS. 3C and 1D and 1E. It will be appreciated that the horizontal position of lip 15a relative to cut line 17 is shown approximately and is variable; as will be discussed further below, packer wheel 34 is adjustable, and combining this with different soil conditions, as well as with the option of using different angles than those specified in this embodiment, for either or both of the packer wheel 34 and the disk 16, means that the closing of lip 15 to position 15a could mean that lip 15a actually ends up outside cut line 17 as shown on FIG. 3C, or on cut line 17 as shown in FIG. 1D, or even inside cut line 17 (not diagrammed).

The angles specified for horizontal and vertical inclination of disk 16 have been developed through trial and error for all-round use in commonly encountered soil types, but in fact a range of angles allows the method to achieve the same (or slightly better) results depending on specific soil conditions, any of which may be useful for a special situation of soil type and hardness, moisture content, or organic residue. This also holds for packer wheel 34 inclinations, shown as $PW_h$ on FIG. 3A for horizontal and $PW_v$ on FIG. 3B for vertical. The disk vertical angle $D_v$ (see FIGS. 3B and 3C) can vary from 10° to 35°, and the disk horizontal angle $D_h$ (FIGS. 3A and 3C) from 4° to 12°. The packer wheel vertical angle $PW_h$ can vary from 5° to 15°; 8° is shown; the packer wheel horizontal angle $PW_h$ can vary from 4° to 10°, with 6° shown.

It should be mentioned that while both inclinations $D_v$ and $D_h$ (vertical and horizontal) in some combination are critical for the disk 16 to properly create the angled furrow 19 with raised lip 15, and to cleanly cut organic stalks 12 as shown best in FIGS. 1B and 1C, instead of hairpinning them as indicated at 12B in the prior art FIGS. 2C through 2E. It is not as critical that the packer wheel 34 be inclined. It is possible to close the furrow 19 with a substantially flat packer wheel ($PW_v$ and $PW_h$ both equalling 0°; not shown). This would leave more disturbed ground and hence more opportunity for weed seeds to propagate (distance $W_i$ in FIG. 1E would be wider than shown); but since such a wider distance would still be less than distance $W_v$ in FIG. 2E (prior art), due to the inclined furrow 19, a substantial gain is still achieved; and furthermore reduced pressure and reduced hairpinning advantages remain unchanged.

Figure 4A:
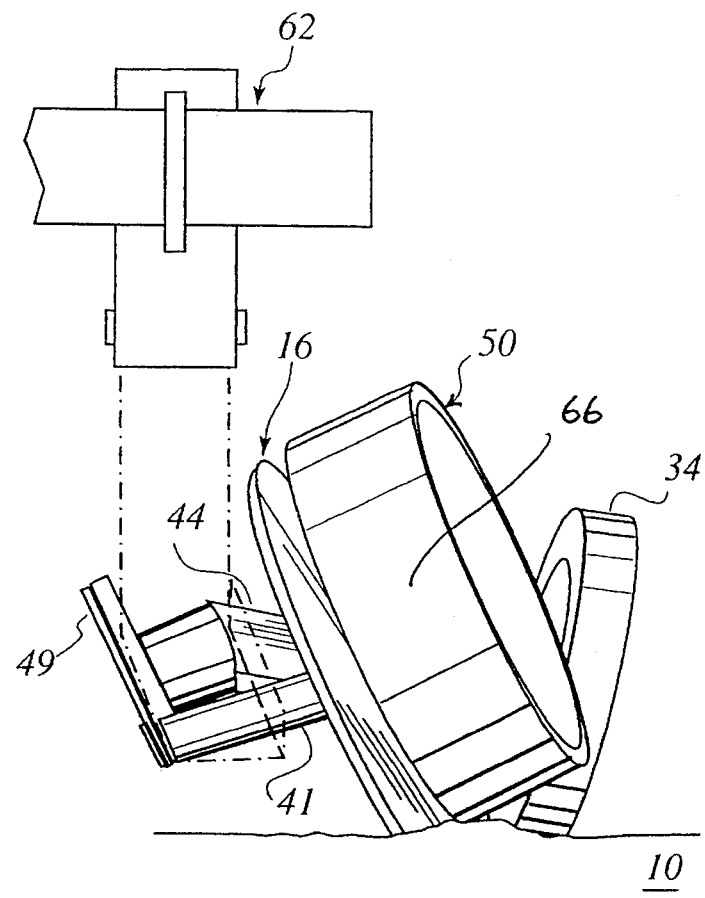
FIG. 4A, an alternative embodiment of the invented inclined disking with cleaner wheel; front view.
Figure 4B:
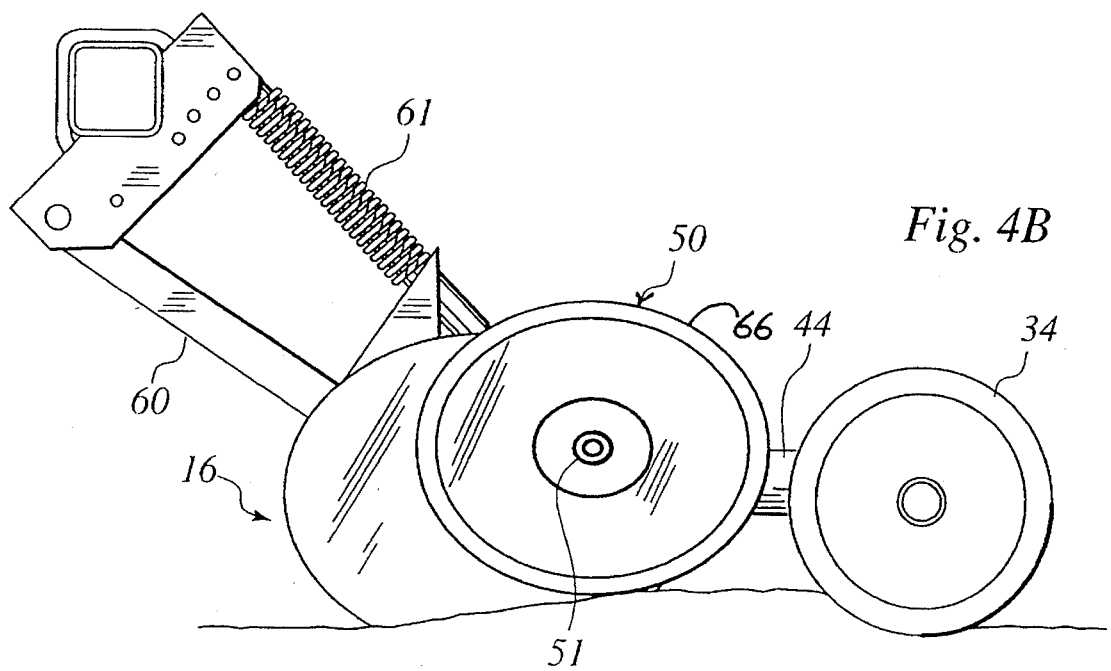
FIG. 4B, the alternative embodiment of FIG. 4A, right side view.

An alternative embodiment, and one which is likely to be used in actual practice since it incorporates useful mechanisms that complement the improvements developed in this disclosure, is one with a cleaning wheel 50 (such as shown in FIGS. 4A and 4B) that removes debris (not shown) from the disk 16. As is illustrated in FIG. 4B, the cleaning wheel 50 adjacent disk 16 also limits the extent to which soil can be lifted by disk 16 and prevents soil from being removed from the furrow. Wheel 50 rides above soil 10, on a linkage (not shown) that connects cleaning wheel axle 51 (FIG. 4B) with disk axle 41 (FIG. 4A). Cleaning wheel 50 is shown riding in a plane parallel to, or very slightly offset from, the plane of disk 16. This arrangement is known in agricultural practice with vertical or line of travel offset disks and need not be itemized further here; cleaning wheels can be used also for depth control of the disk by height adjustment by means of their linkage. It is, however, undesirable to use the cleaning wheel for depth control purposes in the present invention because the resulting packing effect is undesirable at that position since it becomes more difficult to close the furrow. In the embodiment in FIGS. 4A and 4B, disk 16 has its depth controlled by adjustment of angle of packer beam 44 by means of latch-bracket 49, shown in FIG. 4a. This type of adjustment bracket is also known in the art and will not be further detailed.

Of substantial importance in the present case is the use of the cleaning wheel or other cleaning means, such as a scraper, to control the throw of soil from the furrow. As has become increasingly well known, it is important to minimize soil disturbance. At the speed of travel of modern farm machinery, and given the angle of attack of the coulter blade in creating the undercut furrow in the present case, there is a real danger of soil being thrown upwardly and outwardly from the furrow. With the working surface 66 of cleaning wheel 50 placed to operate at or just above the soil surface, the soil throw problem is eliminated, because the working surface 66 of wheel 50 holds the soil in position above the undercut trench.

In the embodiment just described, pressure on disk 16 is maintained, again by known means, by pressure linkage 60 driven by spring 61, as seen in FIG. 4B; both of which extend from agricultural apparatus generally indicated as 62.

Figure 5:
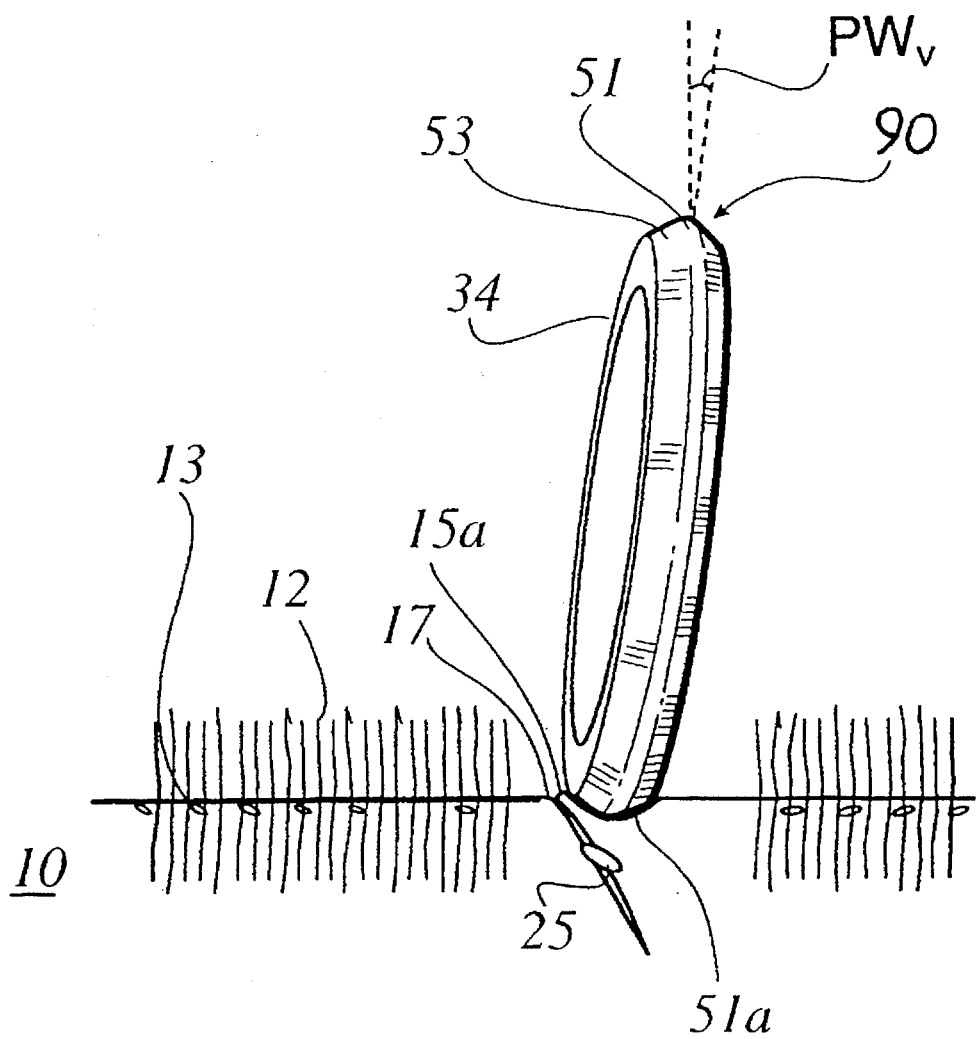
FIG. 5 another alternative embodiment with "V" packer wheel section view across line of travel.

In another embodiment of the invention that has two extra advantages, shown in FIG. 5, the packer wheel 34 has a "V" shaped running surface generally indicated as 90, with a slightly rounded base 51. In the first place this means that the inner face 53 of running surface 90 is angled even more with respect to the vertical than the slight angle of $PW_v$ of the packer wheel 34, and so is helping push lip 15a towards cut line 17. And also rounded base 51 leaves an indentation 51a for seed 25's eventual shoot (not shown) to rise up through.

Figure 6:
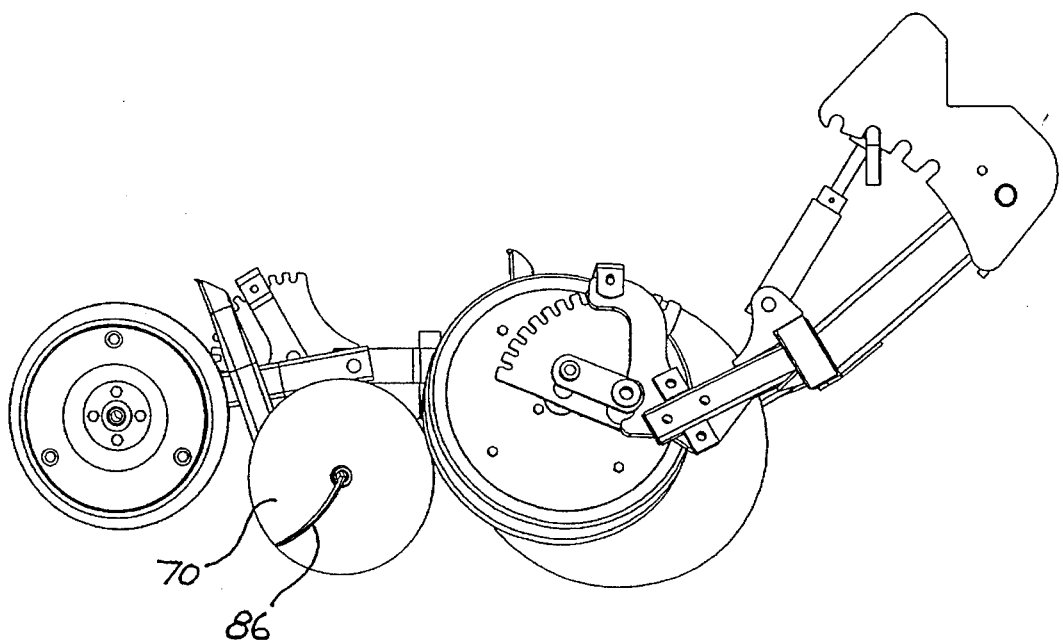
FIG. 6 is a first side elevation of a preferred embodiment of the invention.
Figure 7:
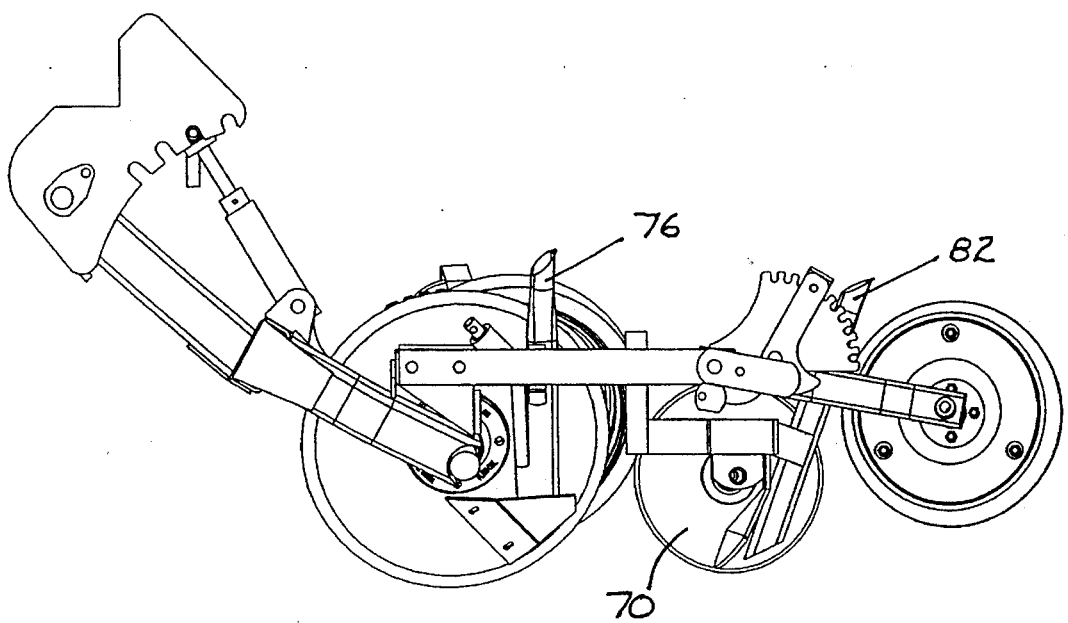
FIG. 7 is a second side elevation of the embodiment of FIG. 6.
Figure 8:
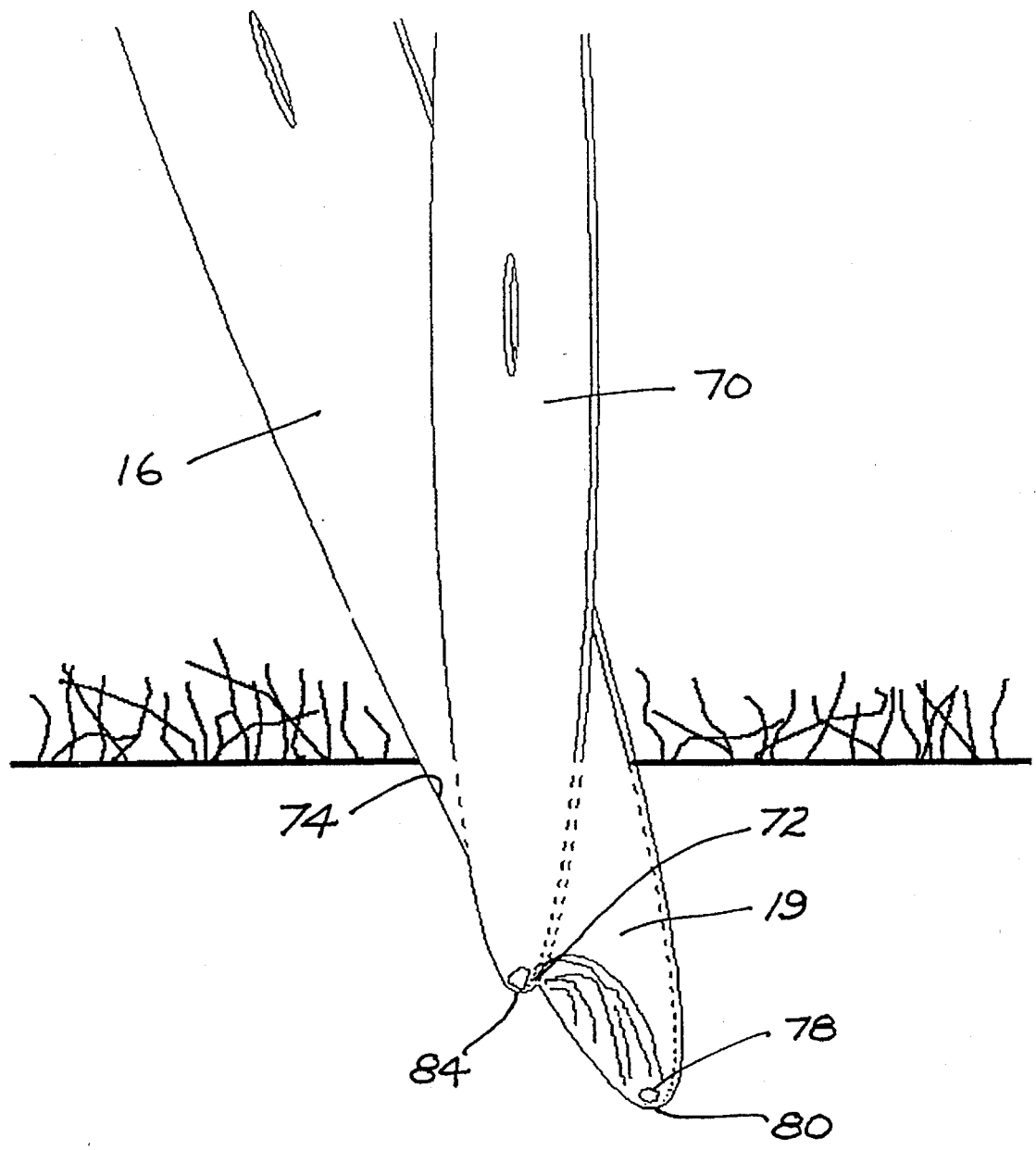
FIG. 8 is a cross-section through a furrow illustrating the embodiment of FIG. 6.

In a highly preferred embodiment of the invention, as illustrated in FIGS. 6 to 8, an additional disk 70 is provided between first disk 16 and packer wheel 34 to cut a second furrow 72 into the lower surface 74 of furrow 19.

While the relative positioning of seed and fertilizer will vary from crop to crop and by fertilizer type, it has become increasingly evident, first, that in many cases seed and fertilizer must be separated; and, second, that the ideal positioning for the fertilizer for certain crops is offset from and below the seed.

Accordingly, in this preferred embodiment first delivery means 76 is for seed or fertilizer is located behind first disk 16 and deposits the seed or fertilizer 78 generally at the bottom 80 of first furrow 19.

Second disk 70 is most preferably at a horizontal angle to the line of travel, the angle being in the same direction relative to the line of travel as the angle of first disk 16. Therefore, as second disk 70 is drawn along lower surface 74 of furrow 19, and cuts second furrow 72, the soil from second furrow 72 is thrown into furrow 19 to cover fertilizer 78. Fertilizer 78 is thus positively separated from seed 25.

Seed or fertilizer delivery means 82 is located behind second disk 70 and deposits seed or fertilizer in second furrow 72.

Packer wheel 34 then simultaneously closes both first furrow 19 and second furrow 72.

Second disk 70 moves within first furrow 19 at the soil surface and so does not further disturb the soil at the surface. The absence of hairpinning, of weed seeds and of soil disturbance as described above thus applies with this most preferred embodiment. Furthermore, the ideal planting situation of fertilizer below and offset from seed has been achieved.

The second disk 70 may be arranged in the tool assembly to penetrate the soil to any desired extent. This will usually be less than or equal to the disk 16 penetration. In the preferred case, as illustrated, the penetration is less, so that the bottom 84 of second furrow 72 is at less depth than the bottom 80 of furrow 19.

The second disk 70 is preferably provided with combined cleaning means and soil throw control means in order to ensure that soil thrown by second disk 70 is properly constrained to furrow 19 to thereby cover fertilizer 78 and avoid soil disturbance. This means may preferably be a cleaning wheel or scraper but in the preferred embodiment and as illustrated comprises scraper 86.

Thus, it is apparent that there has been provided in accordance with the invention a NO-TILL DISK OPENING SYSTEM that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A method for seeding or fertilizing comprising the steps of:

forming in a surface of soil a furrow having two opposed sides inclined to the vertical and forming opposed upper and lower surfaces, and in which said upper surface is extended to form a raised area of said soil, with one of said opposed sides, which forms said upper surface being at a higher elevation than the other of said opposed sides;

preventing soil from being thrown from said furrow during said furrow forming step without applying appreciable pressure to the soil surface;

inserting seed or fertilizer into said furrow; and applying pressure to said raised area to close said furrow.

2. The method of claim 1 wherein the step of applying pressure to close said furrow includes forming an indentation on a top surface of said raised area with a wheel having an outer surface with a generally V-shaped cross section configured to press upon the top surface of said raised area such that the portion of the outer surface of the wheel intermediate the legs of the "V" forms the indentation.

3. A method for seeding or fertilizing comprising the steps of:

forming in a surface of soil a furrow having two opposed sides inclined to the vertical by undercutting an area of soil and raising a part of said undercut area of soil at only one of said opposed sides to open said furrow;

limiting upward and outward movement of said undercut area of soil when raising said undercut area of soil to prevent soil from said undercut area of soil from being thrown from said furrow without applying appreciable pressure to the soil surface;

inserting seed or fertilizer into said furrow; and applying pressure to said raised area to close said furrow.

4. The method of claim 3 wherein the step of applying pressure to close said furrow includes forming an indentation on a top surface of said raised area with a wheel having an outer surface with a generally V-shaped cross section configured to press upon the top surface of said raised area such that the portion of the outer surface of the wheel intermediate the legs of the "V" forms the indentation.

5. A tool assembly for use with an agricultural implement intended to be moved in a specified line of travel and having a frame and connecting means for connecting said tool assembly to said frame, said tool assembly comprising:

a first generally upright rotating disk extending from said connecting means, said disk being set at a first horizontal angle to the line of travel to provide a leading surface and a trailing surface relative to the direction of travel, and being set at a first angle to the vertical whereby a top of said disk is inclined generally toward said trailing surface;

a soil throw control and cleaning member mounted adjacent the leading surface of said disk, said member having a working surface positioned adjacent the soil surface such that no part of said working surface applies appreciable pressure to the soil surface when said tool assembly is in a working position;

a seed or fertilizer delivery mechanism disposed behind said trailing surface of said disk; and a packer wheel substantially in line of travel behind said disk.

6. The tool assembly of claim 5 further comprising depth control means for setting the depth to which said disk will penetrate the soil.

7. The tool assembly of claim 6 wherein said depth control means comprises spring loading means operating through said packer wheel.

8. The tool assembly of claim 5 wherein said soil throw control and cleaning member comprises a wheel.

9. The tool assembly of claim 5 wherein said soil throw control and cleaning member comprises a scraper.

10. The tool assembly of claim 5 wherein said packer wheel is at a second horizontal angle to the line of travel to provide a leading surface and a trailing surface and wherein said second horizontal angle is in an opposite direction from said first horizontal angle relative to said line of travel.

11. The tool assembly of claim 10 wherein said packer wheel is set at a second angle to the vertical whereby a top of said packer wheel is inclined generally toward said trailing surface of said wheel.

12. The tool assembly of claim 11 wherein said second angle to the vertical is about 5° to about 15°.

13. The tool assembly of claim 12 wherein said first horizontal angle is about 8°, said first angle to the vertical is about 23°, said second horizontal angle is about 6°, and said second angle to the vertical is about 8°.

14. The tool assembly of claim 10 wherein said second horizontal angle is between about 4° and about 10°.

15. The tool assembly of claim 5 wherein said first horizontal angle is between about 4° and about 12°.

16. The tool assembly of claim 5 wherein said first angle to the vertical is between about 10° and about 35°.

17. The tool assembly of claim 5 wherein said connecting means in part comprises an axle extending from said disk at said trailing surface.

18. The tool assembly of claim 5 wherein said packer wheel includes an outer surface configured to press upon the soil surface, said outer surface having a generally "V" shaped profile.

19. The tool assembly of claim 18 wherein said generally "V" shaped profile includes a round portion intermediate the legs of the "V".

20. A tool assembly for use with an agricultural implement intended to work on soil in a specified line of travel and having a frame and connecting means for connecting said tool assembly to said frame, said tool assembly comprising:
   a generally upright rotating disk extending from said connecting means and being set at a first horizontal angle to said line of travel to form a leading surface and a trailing surface relative to said line of travel, and at a first angle to the vertical whereby a top of said disk is inclined generally toward said trailing surface;
   a seed or fertilizer delivery mechanism adjacent said trailing surface;
   a cleaning and soil throw control member mounted adjacent said leading surface, said member having a working surface positioned adjacent a top surface of the soil such that no part of said working surface applies appreciable pressure to the soil when said implement is working the soil; and
   a packer wheel substantially in line of travel behind said disk and set at a second horizontal angle to said line of travel to provide a packer leading surface and a packer trailing surface and wherein said second horizontal angle is in a direction opposite to said first horizontal angle relative to said line of travel, and further set at a second angle to the vertical whereby a top of said packer wheel is inclined generally toward said packer trailing surface.

21. The tool assembly of claim 20 further comprising depth control means for controlling the depth of penetration of said disk into the soil when said implement is working the soil.

22. The tool assembly of claim 20 wherein said connecting means comprises in part an axle extending from said disk at said disk trailing surface and an axle extending from said packer wheel at said packer wheel leading surface.

23. The tool assembly of claim 20 wherein said first horizontal angle is between about 4° and about 12°; said first angle to the vertical is between about 10° and about 35°; said second horizontal angle is between about 4° and about 10°; and said second angle to the vertical is between about 5° and about 15°.

24. The tool assembly of claim 20 wherein said packer wheel includes an outer surface configured to press upon the soil surface, said outer surface having a generally "V" shaped profile.

25. The tool assembly of claim 24 wherein said generally "V" shaped profile includes a round portion intermediate the legs of the "V".

26. A method for seeding and fertilizing comprising the steps of:
   forming in soil a first furrow inclined to the vertical and having an upper and a lower surface by undercutting an area of said soil and raising a part of said undercut area to open said first furrow and thereby forming a raised area of said undercut area;
   inserting seed or fertilizer toward the bottom of said first furrow;
   forming a second furrow in said lower surface intermediate the top and bottom of said lower surface;
   directing soil from said second furrow toward the bottom of said first furrow to thereby cover said fertilizer with said soil from said second furrow;
   inserting seed or fertilizer into said second furrow; and
   applying pressure to said raised area to close said first and second furrows.

27. The method of claim 26 further comprising the step of forming the bottom of said first furrow deeper in said soil than the bottom of said second furrow.

28. The method of claim 26 further comprising the step of forming the bottom of said second furrow at the same depth in said soil as the bottom of said first furrow.

29. The method of claim 26 comprising the step of inserting fertilizer into said first furrow and seed into said second furrow.

30. The method of claim 26 comprising the step of inserting seed into said first furrow and fertilizer into said second furrow.

31. The method of claim 26 further comprising the step of limiting upward and outward movement of soil when raising said undercut area of soil and limiting upward movement of soil from said second furrow when forming said second furrow.

32. A tool assembly for use with an agricultural implement intended to be moved in a specified line of travel and having a frame and connecting means for connecting said tool assembly to said frame, said tool assembly comprising:
   a first generally upright rotating disk extending from said connecting means, said disk being set at a first horizontal angle to the line of travel to provide a leading surface and a trailing surface relative to the direction of travel, and being set at a first angle to the vertical whereby a top of said disk is inclined generally toward said trailing surface;
   a soil throw control and cleaning member mounted adjacent the leading surface of said disk and positioned to run at or just above the soil surface when said tool assembly is in a working position;
   a first seed or fertilizer delivery mechanism located behind said trailing surface of said disk;
   a packer wheel substantially in line of travel behind said disk; and
   a second generally upright rotating disk positioned between said disk and said packer wheel to form a second furrow in one surface of a first furrow cut by said first disk, said first seed or fertilizer delivery mechanism being located between said first and second disks; and
   a second seed or fertilizer delivery mechanism located between said second disk and said packer wheel.

33. The tool assembly of claim 32 wherein said second disk is positioned to cut said second furrow to a shallower depth than said first furrow.

34. The tool assembly of claim 33 wherein said first delivery means is adapted to deliver fertilizer to said first furrow and said second delivery means is adapted to deliver seed to said second furrow.

35. The tool assembly of claim 32 wherein said second disk is positioned to cut said second furrow to the same depth as said first furrow.

36. The tool assembly of claim 32 wherein said second disk is set at a third horizontal angle to said line of travel in the same direction from said line of travel as said first disk.

37. The tool assembly of claim 36 wherein said third horizontal angle is about 7° to about 10°.

38. The tool assembly of claim 32 further comprising a soil throw control and cleaner member adjacent said second disk.

39. The tool assembly of claim 38 wherein said soil throw control and cleaner member comprises a cleaning wheel.

40. The tool assembly of claim 38 wherein said soil throw control and cleaner member comprises a scraper.

* * * * *